US006584664B2

(12) United States Patent
Hostetler et al.

(10) Patent No.: US 6,584,664 B2
(45) Date of Patent: Jul. 1, 2003

(54) SLIDING DOOR REPAIR APPARATUS KIT AND METHOD

(76) Inventors: Kelly C. Hostetler, 5260 Third Rd., Lake Worth, FL (US) 33467; Thomas H. Battelene, 5260 Third Rd., Lake Worth, FL (US) 33467

(*) Notice: Subject to any disclaimer, the term of this patent is extended or adjusted under 35 U.S.C. 154(b) by 0 days.

(21) Appl. No.: 09/907,336

(22) Filed: Jul. 17, 2001

(65) Prior Publication Data

US 2003/0014853 A1 Jan. 23, 2003

(51) Int. Cl.[7] .................................................. B23P 6/00

(52) U.S. Cl. ............................... 29/402.01; 29/402.09; 49/425; 160/371; 16/105

(58) Field of Search ......................... 29/402.01, 402.09, 29/402.12, 402.14, 402.15, 525.01, 525.11; 49/425; 160/369, 371, 381; 16/91, 97, 105, 106; 248/207, 226.11, 274.1, 282.1, 283.1, 295.11, 316.8

(56) References Cited

U.S. PATENT DOCUMENTS 1,504,478 A * 8/1924 Hyser ...................... 248/274.1
4,102,009 A * 7/1978 Kelly .......................... 16/105
4,189,870 A * 2/1980 Helmick ...................... 49/425
5,671,502 A 9/1997 Ezman
5,927,017 A 7/1999 Jacobs et al.
6,223,471 B1 * 5/2001 Barber ........................ 49/425

FOREIGN PATENT DOCUMENTS

JP 10317782 A1 * 12/1998

* cited by examiner

*Primary Examiner*—Gregory Vidovich
*Assistant Examiner*—Jermie E. Cozart
(74) *Attorney, Agent, or Firm*—Malin, Haley & DiMaggio, P.A.

(57) ABSTRACT

A sliding door repair apparatus to facilitate horizontal sliding movement of a preinstalled sliding door having one or more defectively sliding wheel(s) being supported on a lower track. The repair apparatus includes at least one vertically adjustable rigid bracket attached to the sliding door and at least one repair roller attached to the bracket such that the repair roller is situated in moveable contact with and atop the lower track and supports at least a portion of the weight of the sliding door thereby transferring the weight from the defective wheel(s) within the door thereby facilitating the sliding of the door along the lower track without the necessity of removing or disassembly of the sliding door and without having to remove, replace or repair the defective wheel(s).

19 Claims, 3 Drawing Sheets

SLIDING DOOR REPAIR APPARATUS KIT AND METHOD

BACKGROUND OF THE INVENTION

1. Field of the Invention

This invention relates generally to a repair apparatus and method for attachment to a sliding door to facilitate the sliding of the door on the door track and without the need to remove and reinstall the door and without the need to remove, replace, or repair the original sliding door wheels whenever a wheel breaks, wears out or malfunctions.

2. Description of Related Art

A sliding door is a well-known moveable closure generally comprising a closure panel connected to an outer frame having wheels or rollers generally mounted within channels in the bottom of the door. The door opening has side to side wheel tracks that guide horizontal movement of the door. Wheel or roller assemblies are usually mounted at or near the four corners of the door panel and extend outward for engagement within the upper and lower tracks. Solid rigid opaque or translucent panels, screening or glass is typically placed within the recesses located within the frame to form the sliding door.

A sliding door is normally held in position by first inserting the upper rollers into a channel or track mounted in the door frame, and then inserting the lowers rollers into a track running along the floor. To inhibit the door from popping out of the lower track, the lower rollers are generally circumferentially grooved to accommodate an upwardly protruding projection running longitudinally within the track and onto which the roller groove rests.

Wheel breakage, wear and tear, and embedded dirt/debris on or within the wheels or rollers on an uneven door track account for most of the improper sliding of the doors. The wheels must be in good working condition for the door to smoothly and continuously slide on the tracks. Previously, if a wheel broke or wore out it had to be immediately replaced to enable proper sliding function of the door.

The replacement of a wheel in a prior art sliding door required removal of the door, disassembly of the door frame to reach and replace the affected wheel and often times necessitated replacement of the entire wheel assembly. This procedure was time consuming, cumbersome, often ran the risk of breakage of the glass door or physical injury, frequently necessitated often difficult to find replacement parts which may even require contacting the door manufacturer, often needed more than one person to perform the task, was costly and, if a screen door, required replacement and re-stretching of the screen within the frame once the wheel assembly was replaced and door reassembled.

BRIEF SUMMARY OF THE INVENTION

After original installation of a sliding door, the lower wheels often begin to wear, break, collect dirt or otherwise malfunction which diminishes the ease with which the door slides horizontally between the open and closed positions. The wheel track can become uneven or not level. Installing the present invention can be accomplished without the prior need to remove the door from the framed opening and removal, replacement or repair of the original wheels.

The sliding door repair apparatus attaches to a conventional sliding door assembly having at least one slideable panel. The sliding door is supported on a lower track and disposed within a door frame. The slideable panel is conventionally constructed typically with at least two wheels attached to and extending downward from the bottom edge of the slideable panel. The wheels support the panel on the lower track and enable the panel to slide in a horizontal fashion to an open and closed position.

The present invention overcomes many of the above prior problems with sliding doors by providing a novel sliding door repair apparatus comprising first and second roller assemblies, each being attached to the sliding door without having to remove the door from the door frame and without having to remove, replace or repair the defective wheel. Each roller assembly has a rigid vertically adjustable bracket attached to a conventional sliding door having upper and lower wheels as originally manufactured, a roller attached to the bracket such that the roller assembly sufficiently assumes the weight bearing pressure placed on the sliding door's original wheels during the sliding action thereby allowing the door to freely, continuously and smoothly slide within the tracks.

More specifically, the present invention comprises a first roller assembly having a first rigid "L" shaped bracket with an elongated slot for receiving a rigid fastener to securely mount and vertically adjust the first bracket into proper height position at the bottom trailing junction of one side member and the bottom member of the slideable panel. The first roller assembly having a roller with a center opening and a first axle threaded through the center opening is mounted to the "L" bracket at the proximal end and has an endcap at the distal end of the first axle to retain the first roller on the first axle. The first roller is situated atop and in rotatable and supporting contact with the lower track, the lateral planar side of the roller being in parallel arrangement relative to the plane of the slideable panel. The weight of the slideable panel is lifted from the original defective wheel(s) by proper height adjustment of the first bracket which transfers the weight to the first roller thereby facilitating the sliding of said door along said lower track.

A second roller assembly also comprises a second rigid "L" shaped bracket having an elongated slot sized to receive a fastener to securely mount and vertically adjust the second bracket into the proper height position on the lower leading edge of the slideable panel. A circumferentially grooved second roller having a center opening is threaded onto a second axle, the ends of the second axle being securely mounted between two opposing arms horizontally projecting from the second bracket situating the second roller atop and in rotatable and supporting contact with the upwardly projecting ridge of the lower track such that the weight of the slideable panel is transferred from the defective wheels to the grooved second roller, thereby facilitating the sliding of said door along said lower track.

The first and second roller assemblies are of simple, economical, and substantially open construction and easily installed on and removed from virtually any sliding door with minimal effort and tools, and without the cumbersome, difficult, dangerous and time-consuming need to remove the door from its previously installed location.

In accordance with these and other objects and advantages which will become apparent hereinafter, the instant invention will now be described with particular reference to the accompanying drawings.

DETAILED DESCRIPTION OF THE PREFERRED EMBODIMENT

Figure 1:
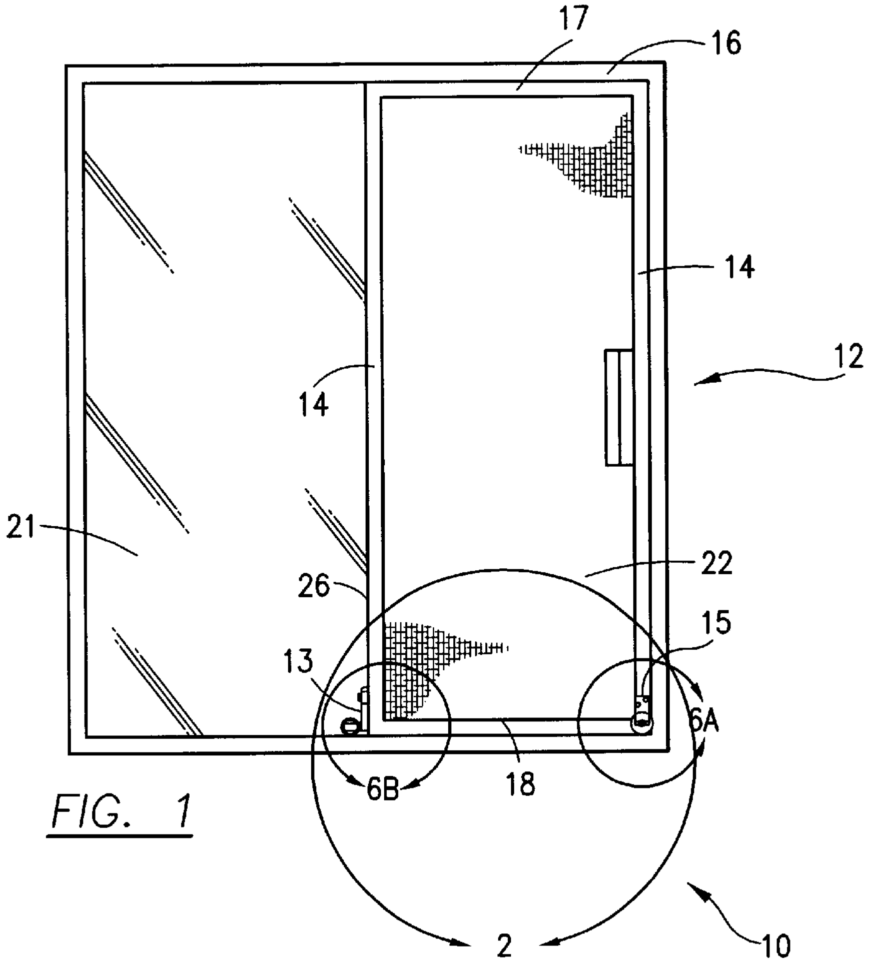
FIG. 1 is a front elevation view showing the present invention in use as attached to a sliding door.

Referring to the drawings, the sliding door repair apparatus according to the present invention is noted generally by the reference numeral 10. In FIG. 1, repair apparatus 10 is shown attached to a sliding door 12 that is comprised primarily of glass door panels 21 and 22. Door panel 21 may be fixed or slideable and occupies approximately one half of the door frame opening. Door panel 22 is a panel which is slideable relative to the door frame 16 between its closed position of FIG. 1 and an open position wherein the panel is disposed alongside door panel 21 (not shown). In its open position, the panel 22 uncovers approximately one half of the opening through the door frame 16 to provide an access opening through the frame. The panel 22 is fitted at its side edges with side framing members 14, at its lower edge with a bottom framing member 18 and at its upper edge a top framing member 17. The top framing member 17, together with side and bottom framing members 14 and 18 respectively, form a rigid rectangle around the slideable door panel 22.

Figure 2:
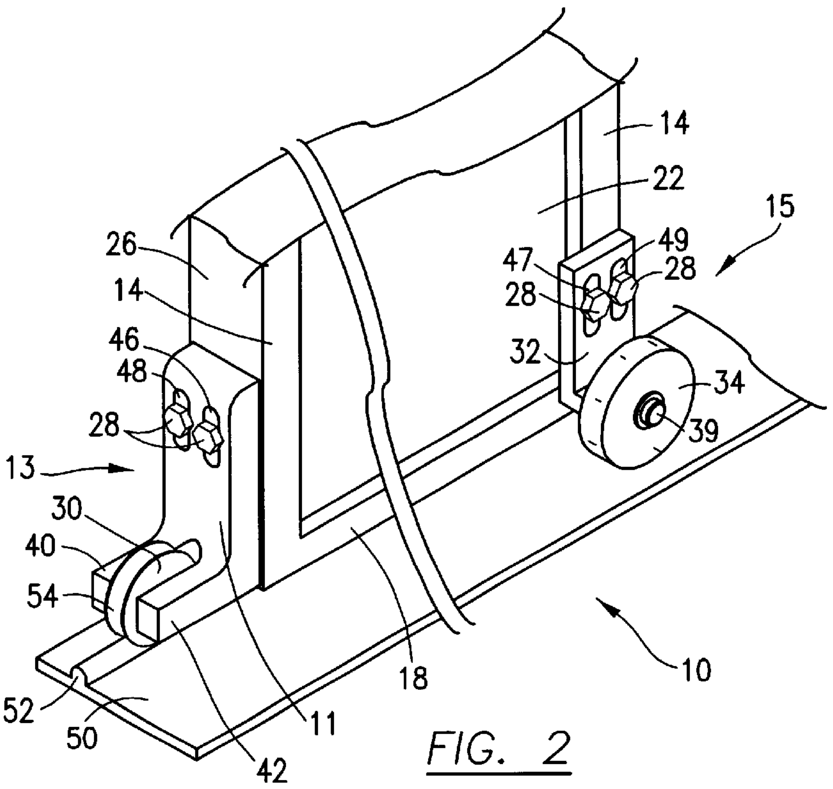
FIG. 2 is an enlargement of the area encircled by the arrow 2 in FIG. 1 with parts broken away for the sake of clarity.

Referring now to FIG. 2, extending along the bottom member of the door frame is an upstanding center ridge 52 extending longitudinally the length of the lower track 50. The slideable door panel 22, as conventionally manufactured, is supported at the bottom on the lower track 50 by a pair of wheel assemblies (not shown). It is these original lower wheel assemblies that become dirty, broken, and defective over time and which give rise to the need for the repair apparatus according to the present invention. The preferred embodiment of the repair apparatus 10 pursuant to the present invention comprises first and second repair roller assemblies, 15 and 13 respectively.

Figure 3:
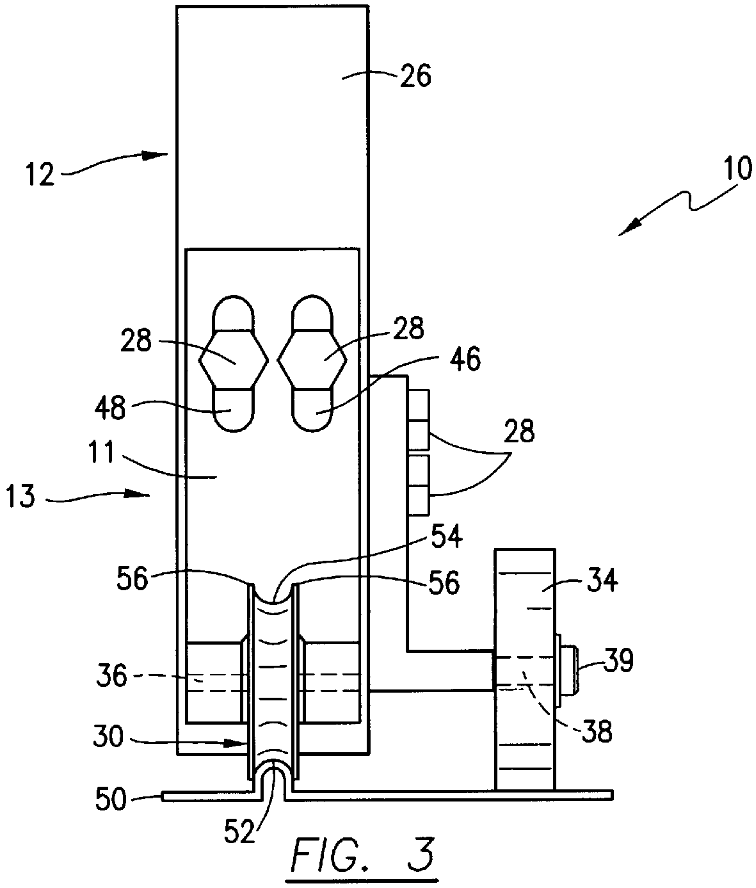
FIG. 3 is a side elevation view of the present invention in use.
Figure 6A:
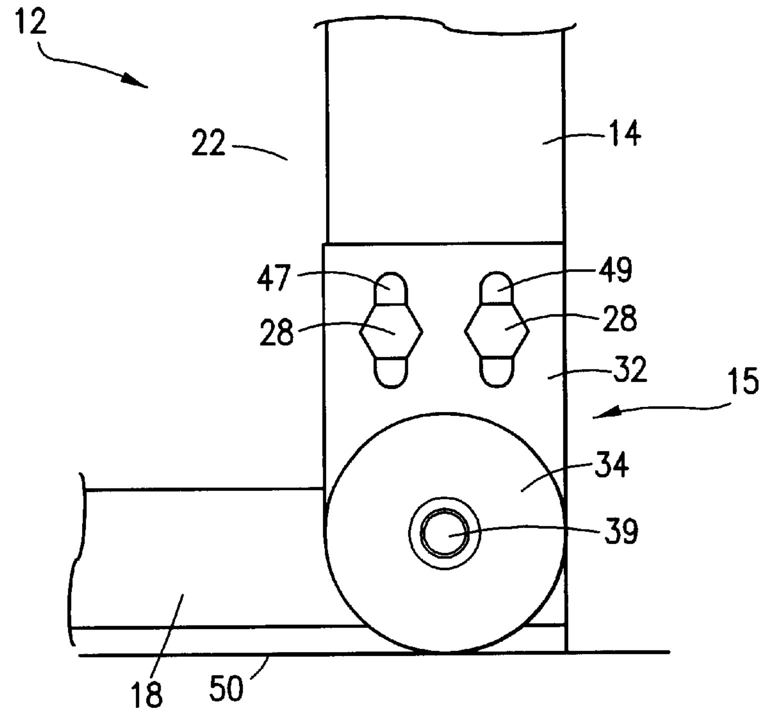
FIGS. 6A and 6B are enlargements of the areas encircled by 6A and 6B in FIG. 1 in front elevation view of both roller assemblies of the present invention.

A first repair roller assembly shown generally in FIGS. 2, 3 and 6A by the reference numeral 15 comprises a rigid bracket 32 positioned at and affixed to the sliding door panel 22 by two fasteners 28 received through two elongated slots 47 and 49. The first repair roller assembly is affixed at the junction of the bottom member 18 and one side member 14, i.e. the lower exterior corner of sliding door 12 and further includes a first repair roller 34, first axle 38 and an endcap 39.

Figure 6B:
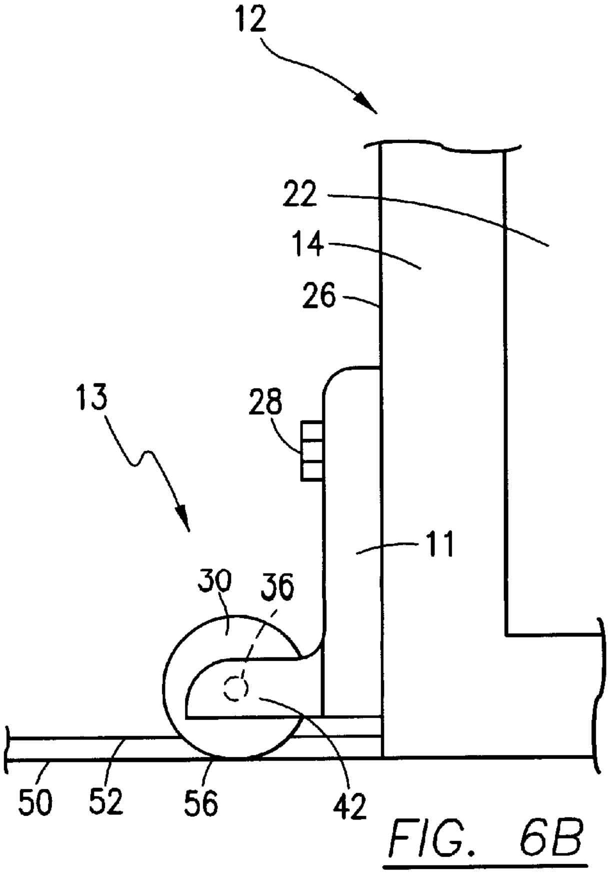

A second repair roller assembly shown in FIGS. 2, 3 and 6B and generally by the reference numeral 13 comprises a rigid bracket 11 having two elongated slots 46 and 48 to receive two fasteners 28, a repair roller 30, a second axle 36, and two horizontally projecting arms 40 and 42 which securely receive the opposing ends of second axle 36. The second repair roller assembly is positioned at the bottom of the leading edge 26 of the sliding door panel 22.

As shown in FIGS. 1, 2, 6A and 6B, brackets 11 and 32 are both substantially "L" shaped and include elongated slots 46 and 48, and 47 and 49 respectively for receipt of fasteners 28, such as bolts or screws. The elongated slot(s) 46 and 48 allow for vertical height adjustment of the bracket 11 on the sliding door panel 22 so as to enable the groove 54 of the repair roller 30 to be positioned in abutting engagement on the center ridge 52 of the lower track 50. The height of both repair rollers 30 and 34 is controlled by the vertical adjustment of the brackets 11 and 32 by fasteners 28 positioned within the respective elongated slot so as to provide sufficient lift to the sliding door panel 22 to alleviate the weight of the sliding door panel 22 from the defective wheel(s), thereby shifting the weight to the repair rollers 30 and 34 to facilitate sliding horizontal movement of the door panel 22.

Only one elongated opening receiving only one fastener for each bracket may also be used, however two openings per bracket is preferred for stability of the bracket against the sliding door panel 22. As the weight of the door is shifted from the defective wheel(s) to the repair roller 30, a smoother horizontal sliding of the door is achieved. A similar weight shift from the defective wheel(s) to repair roller 34 is accomplished with vertical height adjustment of the bracket 32. When tightened securely the fastener(s) 28 force the brackets 11 and 32 into stable abutting arrangement against the leading edge 26 of door 12 and against side and bottom members 14 and 18 of the door panel 22, respectively.

In FIGS. 2 and 3, bracket 11 includes two horizontally projecting arms 40 and 42 which form the base of the "L" shape, the arms 40 and 42 serving as support and receiving points for the ends of the second axle 36 which slidably accommodates the repair roller 30.

The brackets 11 and 32, axles 36 and 38 and repair rollers 30 and 34 are preferably comprised of one or more rigid, durable, non-corroding materials, or a combination thereof, including, but not limited to plastics, such as PVC, polyolefins, e.g. polyethylene, polystyrene, polypropylene, nylon, Teflon® (a registered trademark of E.I.duPont deNemours and Company) or other polymers appropriate for exterior use, stainless steel, or aluminum.

The exterior installation and substantially open configuration of both repair roller assemblies 13 and 15 of the repair apparatus 10, the minimal amount of materials and number of moving parts utilized facilitates construction, decreases manufacturing costs, and enhances accessibility to the repair rollers 30 and 34, if such access should become necessary.

Referring to FIGS. 1, 2 and 3, it will be noted that in assembly 13, repair roller 30 is positioned on the lower portion of the bracket 11 such that the repair roller 30 rotates in a direction perpendicular to bracket member 11 and to the leading edge 26 of the sliding door 12. Accordingly, in this configuration the lateral planar portion of the repair roller 30 will be generally in a plane substantially parallel to the door panel 22.

Repair roller 30 is preferably mounted on an axle 36 supported at both ends by the arms 40 and 42 of the bracket 11. Axle 36 passes through the center of repair roller 30 situating the axle 36 in a generally parallel arrangement to the leading edge 26 of the sliding door panel 22 and substantially perpendicular to the planar surface of the door panel 22. This positioning and configuration facilitates the weight transfer and enhances rolling functionality of the repair roller 30 along ridge 52.

Figure 4:
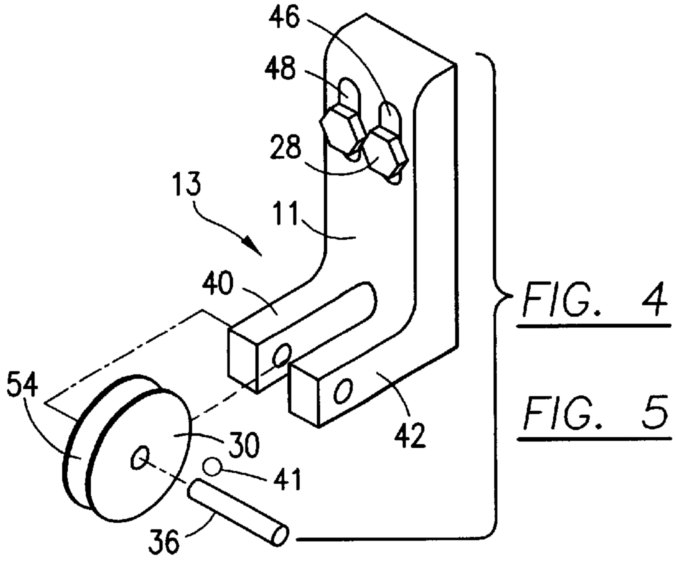
FIG. 4 is a fragmentary exploded view of the roller, axle and bracket assembly situated at the leading edge of the sliding door as shown in FIG. 2.

When in use a majority of the weight of the sliding door panel 22 will bear upon the repair rollers 30 and 34. Reduction of roller friction is often important when the door panel is heavy, e.g. glass. To facilitate the rotation of the repair rollers 30 and 34 about axles 36 and 38 for use with heavier sliding doors, one or more conventional roller bearings 41 as seen in FIG. 4 may be used. Preferably the bearings are encased about the axles 36 and 38, a procedure well known within the art. In lighter weight doors, the repair rollers 30 and 34 may be mounted directly on axles 36 and 38 without the need for bearings. Axles 36 and 38 may be in the form of rods, rivets or bolts.

The desired vertical height position of the repair rollers 30 and 34 is accomplished by adjusting bracket 11 and 32 respectively after attachment to the door panel 22 through the use of one or more fasteners 28 preferably tightened through one or more elongated slots 46 and 48 to secure bracket assembly 13 against the leading edge 26 of the sliding door panel 22 and through one or more elongated slots 47 and 49 to secure bracket assembly 15 against the lower exterior corner of the sliding door panel 22. The fastener(s) 28 each have an enlarged head that bears against the top surface of brackets 11 and 32. The bracket height may be vertically adjusted which directly affects the height by which the sliding door panel 22 is raised or lowered and the amount of door weight transferred to the repair rollers 30 and 34 which otherwise would have been carried by the defective wheel(s) of the door panel 22. Loosening the fasteners 28 allows the brackets 11 and 32 to slide up or down along the plane of the respective areas of the sliding door panel 22 where each bracket 11 and 32 is positioned and when the desired location is attained the fastener 28 can be tightened. In this manner the sliding door panel 22 can be raised or lowered even fractionally, and the weight of the door panel 22 on the defective wheels of the door increased or decreased as desired.

Once the repair apparatus 10 is secured onto the sliding door panel 22 in a manner which allows the transfer of the majority of the weight of the door panel 22 from the defective door wheels (not shown) to the repair rollers 30 and 34, the door panel 22 can then easily slide horizontally along the ridge 52 of door track 50, opening and closing with a smooth and continuous fluid motion. The mounting of the brackets 11 and 32 and height adjustment are performed without the need for removing the sliding door panel 22 from the frame 16, can be accomplished in most instances by a single laborer with minimal effort and tools and with no danger of door panel breakage or physical injury during installation.

As shown in FIGS. 2, 3 and 6B, repair roller 30 includes a centered circumferential groove 54 and a pair of circumferential shoulder portions 56 positioned on either side of grooved center portion 54. When repair roller 30 is received atop lower track 50 it is the groove 54 that is received atop the ridge 52 and the shoulder portions 56 sit astride the ridge 52. This allows for a more even distribution of the door's weight upon the ridge 52 and increases side to side stability of the repair roller 30, the shoulders 56 holding the repair roller more securely atop lower track ridge 52 thereby stabilizing the door panel 22 and inhibiting its lateral movement, such as jumping off the lower track 50.

Figure 5:
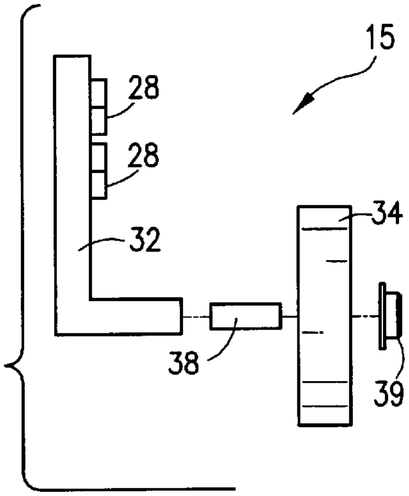
FIG. 5 is a fragmentary exploded view of the roller, axle and bracket assembly situated at the junction of the side and bottom framing members as shown in FIG. 2.

FIGS. 4 and 5 are exploded views of both repair roller assemblies 13 and 15 of the present invention as explained above.

Attachment of both repair roller assemblies 13 and 15 of apparatus 10 provides optimal functionality particularly when more than one lower wheel of the sliding door malfunctions, however, use of only one repair roller assembly 13 or 15 still provides significant improvement in the sliding ability of the door.

The present invention, including one or both roller repair assemblies with installation instructions, can also be packaged in a kit, with or without instructions for use or installation of the assemblies, as an after market item for repair of a sliding door having one or more defective wheels which impede sliding of the door. The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A sliding door repair apparatus that attaches to a defectively sliding conventional sliding door assembly having at least one sliding door, said door including a door frame, said assembly including a lower track for supporting said door, wheels attached to and supporting said sliding door, at least one of said wheels being defective or unable to roll properly on said lower track without the necessity of removing said sliding door from said door frame and without having to remove, replace or repair said defective wheel(s), said sliding door apparatus comprising:

a first repair roller assembly comprising:

a rigid "L" shaped first bracket having an elongated first slot;

a first fastener disposed within said first slot for mounting and vertical adjustment of said first bracket to said sliding door;

a first repair roller having a center opening;

a first axle on which said first repair roller is threaded through said center opening of said first repair roller, said first axle having a proximal end portion attached to said first bracket and an endcap attached to a distal end portion to retain said first repair roller on said first axle, said first repair roller situated atop and in rotatable and supporting contact with said lower track such that the weight of said sliding door is transferred from said defective wheels to said first repair roller thereby facilitating the sliding of said door along said lower track; and a second repair roller assembly comprising:

a rigid "L" shaped second bracket having an elongated second slot;

a second fastener disposed within said second slot for mounting to and vertical adjustment of said second bracket to said sliding door;

a circumferentially grooved repair roller having a center opening;

a second axle sized to receive said grooved second repair roller through said center opening of said second repair roller; and two opposing arms horizontally projecting from said second bracket, said arms sized and positioned to receive, secure and support the ends of said second axle and said second repair roller being situated atop and in rotatable and supporting contact with said lower track such that the weight of said sliding door is transferred from said wheels to said grooved second repair roller thereby facilitating the sliding of said door along said lower track.

2. The sliding door repair apparatus of claim 1, including said sliding door having a lower leading edge;

said second repair roller assembly being attached to the lower leading edge of said sliding door.

3. The sliding door repair apparatus of claim 1 including:

said sliding door having a lower lateral exterior trailing corner; said first repair roller assembly attached at the lower lateral exterior trailing corner of said sliding door.

4. The sliding door repair apparatus of claim 1 wherein said fastener is a screw or a bolt.

5. The sliding door repair apparatus of claim 1 wherein said first repair roller or said grooved second repair roller further includes at least one bearing to facilitate the rotation of said first repair roller or said second repair roller about said respective first axle or said second axle.

6. The sliding door repair apparatus of claim 1 wherein said apparatus is constructed of a non-corroding material selected from the group of aluminum, stainless steel, PVC, polyolefins, plastics or combination thereof.

7. The repair apparatus of claim 1 wherein said first repair roller is a repair wheel.

8. The repair apparatus of claim 7 wherein said first repair wheel further includes one or more bearings.

9. The sliding door repair apparatus of claim 1 wherein said second repair roller is a repair wheel.

10. The repair apparatus of claim 9 wherein said repair wheel further includes one or more bearings.

11. A method for repairing a sliding door comprising the steps of:

providing a conventional sliding door disposed within a door frame atop a lower track, said door having one or more defective lower wheels which do not allow said door to slide smoothly; and attaching to said sliding door the sliding door repair apparatus of claim 1, without removing said sliding door from said door frame and without having to remove, replace or repair said defective wheel(s).

12. The method of claim 11 wherein said first repair roller and said second repair roller are wheels.

13. An article of manufacture comprising a first repair roller assembly and a second repair roller assembly according to claim 1, packaged together.

14. A sliding door assembly comprising:

a conventional sliding door having at least one slideable panel and at least one defective wheel attached to the bottom edge of said slideable panel, said defective wheel(s) not rolling properly;

a lower track on which said defective wheel(s) rest and are to rotate to enable horizontal movement of said sliding door;

a conventional door frame in which said sliding door is installed and on which said lower track rests;

a rigid bracket having an elongated slot for vertical adjustment of said bracket against said slideable panel;

at least one repair roller having a center opening;

at least one axle threaded through said repair roller center opening, said axle being attached to said bracket such that said repair roller rests atop and in rotatable supporting contact with said lower track;

a fastener positioned through said elongated slot for mounting said bracket to and for vertical adjustment of said bracket on said slideable panel without having to remove said sliding door from its place of installation within said door frame, after proper height adjustment of said bracket said fastener is tightened to secure said bracket to said slideable panel at a height sufficient to transfer the weight of said slideable panel from said defective wheel(s) to said repair roller to facilitate the door sliding process without the necessity of removing said sliding door from said door frame and without having to remove, replace or repair said defective wheel(s).

15. A sliding door repair apparatus that attaches to a conventional sliding door assembly having a sliding door disposed on a lower track situated within a door frame, one or more defective wheels attached to and supporting said sliding door on said lower track, wherein at least one of said defective wheels is unable to roll properly on said lower track, said repair apparatus comprising:

a rigid “L” shaped bracket having an elongated slot;

a fastener disposed within said slot mounting said bracket to said sliding door;

a repair roller having a center opening; and an axle threaded through said center opening of said repair roller, said axle having a distal end portion attached to said bracket, and a proximal end having an endcap to retain said repair roller threaded onto said axle, said repair roller situated atop and in rotatable and supporting contact with said lower track such that the weight of said sliding door is transferred from said defective wheel(s) to said repair roller thereby facilitating the sliding of said door along said lower track without the necessity of removing said sliding door from said door frame and without having to remove, replace or repair said defective wheel.

16. A sliding door repair apparatus that attaches to a sliding door assembly having at least one slideable panel disposed on a lower track situated at the bottom edge of and within a door frame, one or more defective wheels attached to and supporting said sliding door on said lower track, wherein at least one of said defective wheels is unable to roll properly on said lower track, said repair apparatus comprising:

a rigid “L” shaped bracket having an elongated slot;

a rigid fastener disposed within said slot for mounting to and vertical adjustment of said bracket to said slideable panel;

a circumferentially grooved repair roller having a center opening;

an axle sized to receive said grooved repair roller through said center opening of said repair roller; and two opposing arms horizontally projecting from said bracket, said arms sized and positioned to securely receive and support the ends of said axle, said grooved repair roller being threaded onto said axle and situated atop and in rotatable and supporting contact with said lower track such that the weight of said slideable panel is transferred from said defective wheel(s) to said grooved repair roller thereby facilitating the sliding of said door along said lower track without having to remove said sliding door from said door frame and without having to remove, replace or repair said defective wheel(s) sliding panel.

17. A kit for facilitating the sliding of a sliding door having one or more defectively sliding wheels along a lower track situated within a door frame in which said sliding door is disposed, said kit comprising:

a first repair roller assembly comprising:

a rigid “L” shaped first bracket having an elongated first slot;

a first fastener disposed within said first slot for mounting and vertical adjustment of said first bracket to said sliding door;

a first repair roller assembly having a center opening;

a first axle on which said first repair roller is threaded through said center opening of said first repair roller, said first axle having a proximal end portion attached to said first bracket and an endcap attached to a distal end portion to retain said first repair roller on said first axle, said first repair roller situated atop and in rotatable and supporting contact with said lower track such that the weight of said sliding door is transferred from said defective wheel(s) to said first repair roller thereby facilitating the sliding of said door along said lower track; and a second repair roller assembly comprising:

a rigid "L" shaped second bracket having an elongated second slot;

a second fastener disposed within said second slot for mounting to and vertical adjustment of said second bracket to said sliding door;

a circumferentially grooved repair roller having a center opening;

a second axle sized to receive said grooved second repair roller through said center opening of said second repair roller;

two opposing arms horizontally projecting from said second bracket, said arms sized and positioned to securely receive and support the ends of said second axle and said second repair roller being situated atop and in rotatable and supporting contact with said lower track such that the weight of said sliding door is transferred from said defective wheel(s) to said grooved second repair roller thereby facilitating the sliding of said door along said lower track.

18. The kit according to claim 17 wherein said first repair roller or said second repair roller is a repair wheel having one or more bearings to facilitate rotation.

19. The kit according to claim 17 further including instructions for use or installation of said first and second repair roller assemblies on said sliding door.

* * * * *